US011398908B2

(12) United States Patent
Varadharajan

(10) Patent No.: US 11,398,908 B2
(45) Date of Patent: Jul. 26, 2022

(54) METHODS AND APPARATUS TO DECONFLICT MALWARE OR CONTENT REMEDIATION

(71) Applicant: McAfee, LLC, Santa Clara, CA (US)

(72) Inventor: Srinivasan Varadharajan, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 74 days.

(21) Appl. No.: 16/547,245

(22) Filed: Aug. 21, 2019

(65) Prior Publication Data
US 2021/0058251 A1 Feb. 25, 2021

(51) Int. Cl.
*H04L 9/32* (2006.01)

(52) U.S. Cl.
CPC .......... *H04L 9/3213* (2013.01); *H04L 9/3242* (2013.01)

(58) Field of Classification Search
CPC .... H04L 9/0643; H04L 9/3242; H04L 9/3213
See application file for complete search history.

(56) References Cited

U.S. PATENT DOCUMENTS

| 8,484,482 | B1 * | 7/2013 | Cherukumudi | G06F 21/31 713/184 |
| 9,271,110 | B1 * | 2/2016 | Fultz | H04W 12/06 |
| 9,712,503 | B1 | 7/2017 | Ahmed et al. | |
| 10,142,464 | B1 * | 11/2018 | Cairns | H04W 80/12 |
| 10,305,911 | B1 | 5/2019 | Eyre et al. | |
| 2007/0011245 | A1 * | 1/2007 | Kawashima | H04L 51/28 709/206 |
| 2013/0185802 | A1 | 7/2013 | Tibeica et al. | |
| 2014/0259158 | A1 | 9/2014 | Brown et al. | |
| 2017/0070460 | A1 | 3/2017 | Bejerasco et al. | |
| 2017/0163641 | A1 * | 6/2017 | Adkins | G06K 15/407 |
| 2018/0332016 | A1 * | 11/2018 | Pandey | H04L 63/108 |
| 2019/0158487 | A1 * | 5/2019 | Hayes | H04W 12/06 |
| 2019/0342101 | A1 * | 11/2019 | Hayes | H04L 9/002 |
| 2020/0067977 | A1 | 2/2020 | Lee et al. | |
| 2021/0058401 | A1 | 2/2021 | Pivetta et al. | |

FOREIGN PATENT DOCUMENTS

| CN | 108512849 | 6/2020 |
| WO | 2021035073 | 2/2021 |

OTHER PUBLICATIONS

International Searching Authority, "Search Report," issued in connection with International Patent Application No. PCT/US2020/047242, dated Dec. 7, 2020, 7 pages.

(Continued)

*Primary Examiner* — Mohammad A Siddiqi
(74) *Attorney, Agent, or Firm* — Hanley, Flight & Zimmerman, LLC

(57) ABSTRACT

Methods, apparatus, systems, and articles of manufacture to deconflict malware or content remediation are disclosed. An example apparatus includes at least one processor and memory including instructions that, when executed, cause the at least one processor to at least identify data to be encoded into a token, compute a hashed string based on the data to be encoded, determine a number of characters to be included in the token, select a subset of characters from the hashed string, and generate the token using the subset of characters from the hashed string.

21 Claims, 12 Drawing Sheets

(56) References Cited

OTHER PUBLICATIONS

International Searching Authority, "Written Opinion," issued in connection with International Patent Application No. PCT/US2020/047242, dated Dec. 7, 2020, 10 pages.
United States Patent and Trademark Office, "Non-Final Office Action", issued in connection with U.S. Appl. No. 16/547,250, filed May 6, 2021, (19 pages).
United States Patent and Trademark Office, "Notice of Allowance and Fee(s) Due", issued in connection with U.S. Appl. No. 16/547,250, filed Nov. 17, 2021, (8 pages).
United States Patent and Trademark Office, "Notice of Allowance and Fee(s) Due", issued in connection with U.S. Appl. No. 16/547,250, filed Mar. 11, 2022, (8 pages).
European Patent Office, "Communication pursuant to Rules 161(1) and 162 EPC", issued in connection with European Patent Application No. 20767663.6, dated Mar. 29, 2022, (3 pages).

\* cited by examiner

METHODS AND APPARATUS TO DECONFLICT MALWARE OR CONTENT REMEDIATION

FIELD OF THE DISCLOSURE

This disclosure relates generally to malware or content remediation, and, more particularly, to methods and apparatus to deconflict malware or content remediation.

BACKGROUND

Malware (e. g, viruses, worms, trojans, ransomware) is malicious software that is disseminated by attackers to launch a wide range of security attacks, such as stealing user's private information, hijacking devices remotely to deliver massive spam mails, and infiltrating a user's online account credentials. Malware has caused serious damages and significant financial loss to many computer and Internet users. Users may encounter malicious websites that include malware. To avoid such websites, users may be asked to confirm that they desire to visit a potentially malicious website prior to navigating to the potentially malicious website.

BRIEF DESCRIPTION OF THE DRAWINGS

The figures are not to scale. In general, the same reference numbers will be used throughout the drawing(s) and accompanying written description to refer to the same or like parts.

Figure 1:
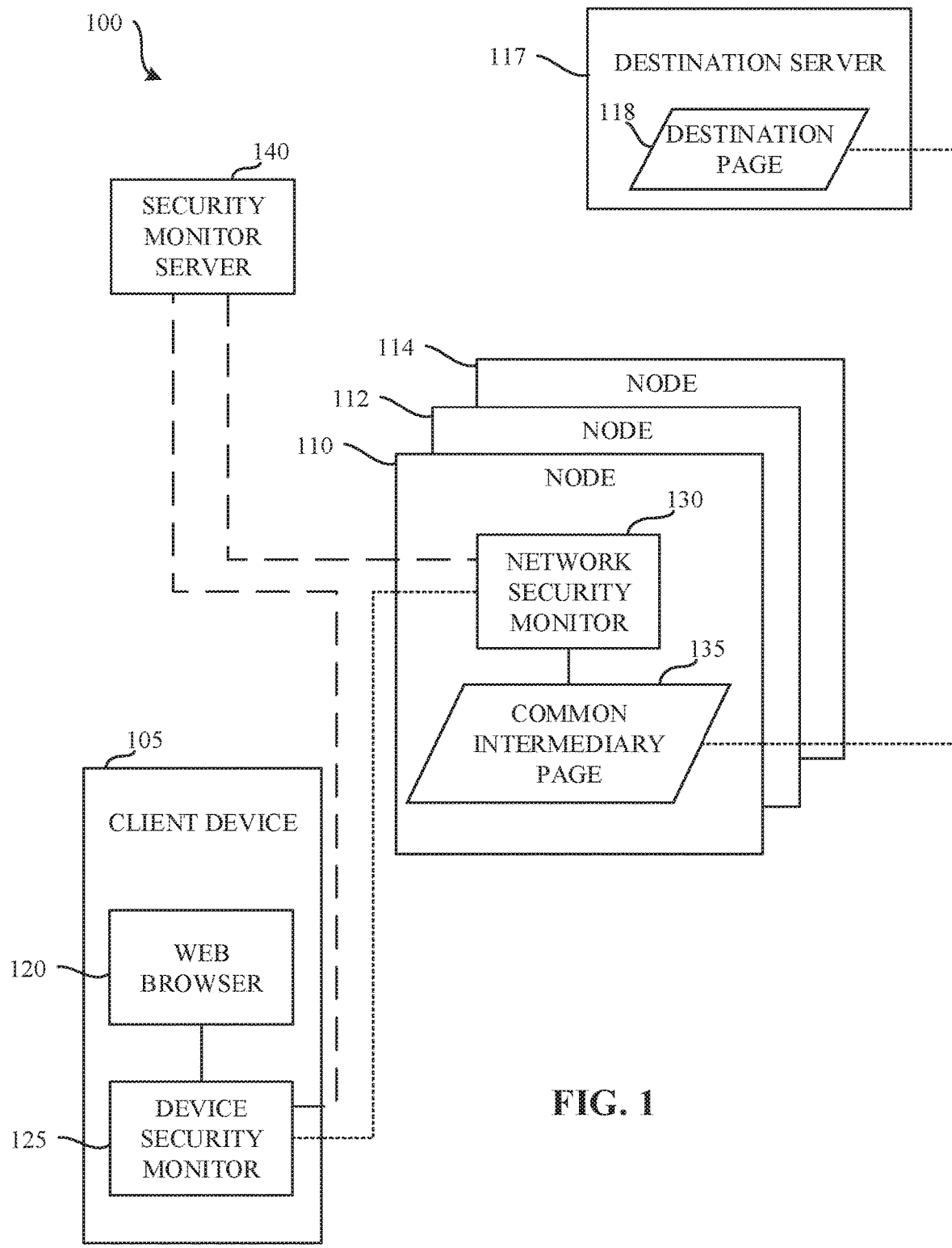
FIG. 1 depicts an example system to deconflict malware or content remediation in an example environment.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Malware has caused serious damages and significant financial loss to many computer and Internet users. Users may encounter malicious websites that include malware. To avoid such websites, users may be asked to confirm that they desire to visit a potentially malicious website prior to navigating (e.g., prior to their browser serving a HyperText Transfer Protocol (HTTP) request) to the potentially malicious website. In examples disclosed herein, different approaches for implementing the prompt to the user may be utilized. For example, a prompt driven by a device security monitor operating on the user device may present the prompt. Separately, the prompt may be driven by a network security monitor operating on a network node (e.g., a router, a proxy, etc.). Consider, for example, a scenario in which multiple security monitors are operated (e.g., one at the user device and another at one or more network nodes). These security monitors may share functionality such as, for example, Safe Surfing, a feature used to ensure users visit safe websites. Typically, this functionality ensures that the user is protected at multiple levels. For example, a user is protected on their client device (e.g., a mobile device) regardless of whether they use their home network (protected by a network security monitor). Likewise, other devices operating on the home network benefit from the protection afforded by the network security monitor.

However, in some examples, both security monitors may attempt to enforce the same safe-surfing policy. As a result, the user might receive a first prompt from the security monitor at the client device and a second prompt from the security monitor at the network node (e.g., despite having acknowledged the first prompt).

Example approaches disclosed herein seek to deconflict such prompts by passing acknowledgment information between security monitors. Such an approach enables information such as user choices (e.g., a user choice to visit a potentially malicious website) to be passed forward and prevent the user from being prompted multiple times. Thus, if a user made a choice in response to a prompt by the security monitor of the client device, such information is provided (e.g., forwarded) to subsequent network nodes, enabling those subsequent network node(s) to determine whether to display a prompt at least partially based on the user selection. Such are approach provides an enhanced user experience, as users are not asked multiple times whether they wish to visit a potentially malicious site. Moreover, such an approach is more computationally efficient than other approaches, as such an approach does not rely on a centralized exception database to track and synchronize such information.

As used herein, a destination page is defined as a website page requested by a user that device security monitors and network security monitors may classify as benign or a phishing attack. As used herein, a block page is defined as a website page served to a user to prevent the user from accessing a requested destination page. Contents of a block page may include a prompt for the user to approve the blocked destination page. As used herein, a platform page is defined as an intermediary page with an encoded URL to communicate a user's request information between device security monitors and network security monitors. The platform page may be presented after a user approves a destination page using a prompt on a block page, and the platform page may redirect the user to the requested destination page.

Example approaches disclosed herein pass data concerning a user's choice in a URL, as part of an internal call from a block page to a platform page, which may then redirect to the destination page. This call and URL is seen by other endpoints as any network request goes through them. Such an approach syncs the device security monitor and the network security monitor as well, without requiring complex interactions and/or maintaining user state at a server.

FIG. 1 depicts an example system 100 to deconflict malware or content remediation in an example environment of use. The example system 100 of the illustrated example includes a client device 105, and one or more nodes 110, 112, 114. The example client device 105 communicates with a destination server 117 to access a destination page 118 via one or more of the nodes 110, 112, 114. As used herein, the destination server is defined as the webserver to handle requests to access the contents of a destination page. In the illustrated example of FIG. 1, the example client device 105 includes a web browser 120 and a device security monitor 125. The example node 110, 112, 114 of the illustrated example of FIG. 1 includes a network security monitor 130 that hosts a common intermediary page 135. The example client device 105 and the example network security monitor 130 communicate via an example security monitor server 140.

The example client device 105 of the illustrated example of FIG. 1 is implemented by a user-controlled device that is enabled to access various networks (e.g., a local area network (LAN), a wide area network (WAN), etc.). The example client device 105 allows various user inputs and is able to display content accessed from a network. In some examples, the client device 105 may be implemented by, for example, a mobile device (e.g., a cell phone, a smartphone), a personal computer, a tablet computer, etc. As noted above, the example client device 105 includes the web browser 120 and the device security monitor 125.

The example web browser 120 of the illustrated example of FIG. 1 is implemented by computer executable instructions. The web browser 120 allows the user to navigate to various destination sites (e.g., sites hosted by the destination server) and request access through the node(s) 110, 112, 114 to such destination sites. Any desired web browser (e.g., MICROSOFT EDGE, GOGGLE CHROME, MOZILLA FIREFOX, etc.) may be used. While examples disclosed herein are described in the context of a web browser, any other application and/or instructions that enable the client device 105 to access and display information may additionally or alternatively be used.

The example device security monitor 125 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. The device security monitor 125 protects the user from potentially harmful websites by monitoring site access requests and blocking sites that are unsafe and/or unauthorized by the user. An example implementation of the device security monitor 125 is described below in further detail in connection with FIG. 2.

The example node 110 of the illustrated example of FIG. 1 is implemented by a computing device within the example network. Such nodes may include, for example, modems, routers, servers (e.g., a proxy server), etc. In the illustrated example of FIG. 1, the example nodes 112, 114 are implemented in the same way as the example node 110. However, in some examples, the nodes 112, 114 may be implemented differently than the example node 110 (e.g., with different hardware and/or software). In some examples, the nodes 110, 112, 114 process requests from the client device 105 from a prior node before such communications are routed to their destination (e.g., to the destination server 117).

The example destination server 117 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example destination server 117 hosts the destination site 118, which the destination server 117 serves after receiving a request from the example nodes 110, 112, 114.

The example network security monitor 130 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The network security monitor 130 protects the client device 105 from potentially harmful websites by monitoring site access requests and blocking sites that are unsafe and/or unauthorized by the user. An example approach to implementing the example network security monitor 130 is described in further detail in connection with FIG. 3.

The example security monitor server 140 is a server that communicates via a network such as, for example, the Internet, to provide instructions that may be executed at the client device 105 and/or at the node 110, 112, 114. That is, the example security monitor server 140 provides a first set of instructions to the device security monitor 125 to prevent the client device from accessing phishing attack websites. The example security monitor 140 provides a second set of instructions to the network security monitor 130 to create and transmit block pages and intermediary pages. In some examples, the instructions provided to the client device 105 and/or the node 110, 112, 114 are executable instructions that may be directly executed at the client device 105 and/or the node 110, 112, 114. However, in some examples, the instructions are provided as part of a software development kit (SDK), application programming interface (API) to an intermediary party (e.g., a manufacturer, an app developer) to enable the intermediary party to create (e.g., design, develop, compile, etc.) executable instructions (e.g., an application, firmware, etc.) to be executed at the client device 105 and/or the node 110, 112, 114

Figure 2:
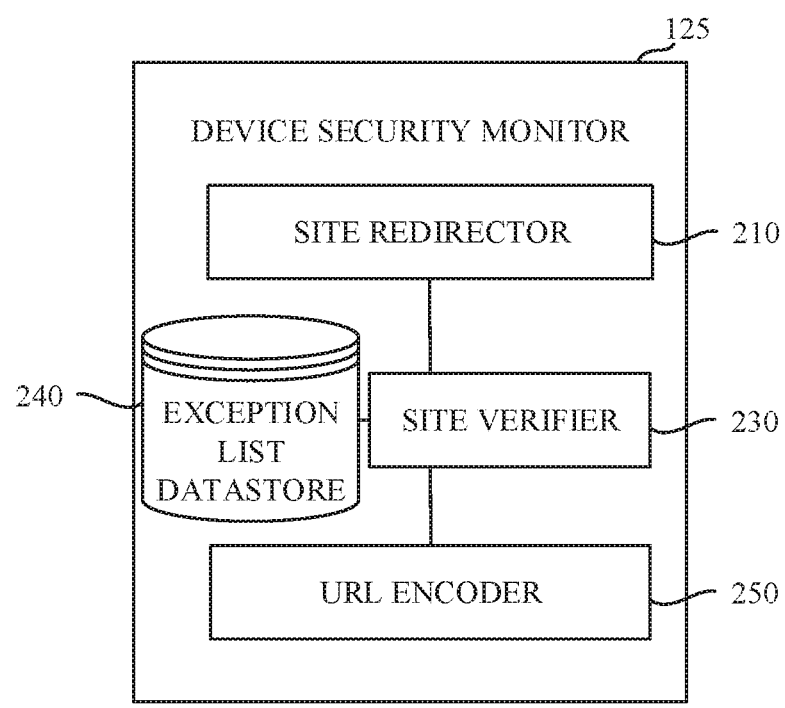
FIG. 2 is a block diagram of an example implementation of the device security monitor of FIG. 1.

FIG. 2 is a block diagram of an example implementation of the device security monitor 125 of FIG. 1. The example device security monitor 125 of the illustrated example of FIG. 2 includes a site redirector 210, a site verifier 230, an exception list datastore 240, and a URL encoder 250.

The example site redirector 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The site redirector 210 sends requests HyperText Transfer Protocol (HTTP) Secure (HTTPS) requests) from the client device 105 to the network nodes 110, 112, 114 to access sites such as the destination page 118 and the intermediary page 135. The example site redirector 210 may implement means for identifying a first request to be transmitted from a client device to a destination site identified by a URL.

The example site verifier 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example site verifier 230 inspects a request (e.g., an HTTP request) accessed at the device security monitor 125 to determine if the request indicates that the user authorized navigation to a destination site (e.g., in response to a prompt). In some examples, the example site verifier 230 determines that the user has authorized navigation to the requested site when the site URL is for an intermediary page. If the request does not indicate that the user has authorized navigation to the destination site, the example site verifier 230 determines whether the destination site should be blocked. In examples disclosed herein, the example site verifier 230 determines whether the destination site should be blocked by consulting, for example, a list of known malicious sites. However, any other approach for determining whether a destination site should be blocked may additionally or alternatively be used. If the example site verifier 230 determines that the destination site 118 should not be blocked, the example site redirector 210 directs the request to the destination page 118. The example site verifier 230 may implement means for determining whether the user has authorized the navigation to the destination site.

If the example site verifier 230 determines that the destination site 118 should be blocked, the example site verifier 230 determines whether the destination site 118 is already present on the exception list. If the destination site 118 is not on the exception list, the example site verifier 230 causes an authorization prompt to be displayed to the user. The example site verifier 230 inspects the request to determine if the request indicates that the user authorized navigation to the destination site. The user may indicate their authorization (e.g., an indication that the user has accepted the risk of navigating to a potentially malicious website) by, for example, clicking on a link in a prompt displayed via a user interface of the client device 105.

The example exception list datastore 240 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example exception list datastore 240 may be in any data format such as, for example, binary data, comma delimited data, tab delimited data, structured query language (SQL) structures, etc. While, in the illustrated example, the exception list datastore 240 is illustrated as a single device, the example exception list datastore 240 and/or any other data storage devices described herein may be implemented by any number and/or type(s) of memories. In the illustrated example of FIG. 2, the example exception list datastore 240 stores an exception list including URL(s) of sites that the user has previously authorized. In the examples disclosed herein, the exception list datatstore 240 stores an identifier for domains authorized by a user as a whitelist. However, any other methods of storing an exception list may additionally and/or alternatively used.

The example URL encoder 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The URL encoder 250 creates a URL for the intermediary page 135 using the domain of the destination page 118 and information from the client device 105. The example URL encoder 250 may implement means for generating a data field based on the domain of the destination site. The example URL encoder 250 allows device security monitors 125 and/or network security monitors 130 to both securely transmit information between a client device 105 and network nodes 110, 112, 114 and to verify that information regarding site access requests originate from a trusted source.

Figure 3:
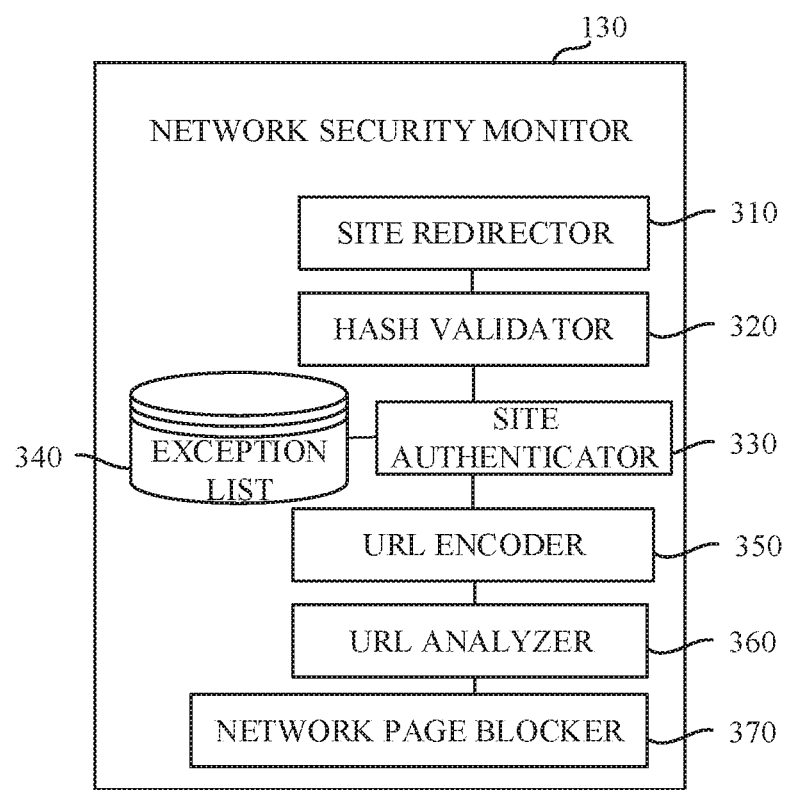
FIG. 3 is a block diagram of an example implementation of the network security monitor of FIG. 1.

FIG. 3 is a block diagram of an example implementation of the network security monitor 130 of FIG. 1. The example network security monitor 130 of the illustrated example of FIG. 3 includes a site redirector 310, hash validator 320, a site authenticator 330, an exception list datastore 340, and a URL encoder 350.

The example site redirector 310 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The site redirector 310 accesses a request received at the network security monitor 130 of the network node 110, 112, 114, and relays the request to a location determined by the example network security monitor 130. For example, the example site redirector 310 may redirect a request to the destination page 118, the intermediary page 135, etc. The example site redirector 310 may implement means for directing to the destination site. If the example site verifier 230 determines that the destination site 118 should not be blocked, the example site redirector 210 directs the request to the destination page 118. Otherwise, the example site redirector 210 directs the request to a block page.

The example hash validator 320 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The hash validator 320 computes the hash based on the domain of the destination page 118 and verifies that the requested URL of the intermediary page 135 matches the computed hash. The example hash validator 320 may implement means for validating to verify that a first token matches a second token. The example hash validator 320 is necessary to confirm that the requested URL of the intermediary page originates from a trusted device security monitor 125 or network security monitor 130.

The example site authenticator 330 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The site authenticator 330 determines whether to block a destination site 118 for which access has been requested. The example site authenticator 330 determines whether to block a request based on whether, for example, the request was for a domain included in the exception list. Additionally, the example site authenticator 330 determines whether a request should be blocked by consulting, for example, a list of known malicious sites. This may be performed by comparing portions of the domain to the list. However, any other approach for determining whether a request should be blocked may additionally or alternatively be used. If the example site authenticator 330 determines that the destination site 118 should not be blocked, the example site redirector 310 directs the request to the destination page 118. In some examples, if the example site authenticator 330 determines that the destination site 118 should be blocked, the example site redirector 310 may redirect to a block page. In other examples, if the example site authenticator 330 determines that the destination site 118 should be blocked, the example site redirector 310 may ignore the request. The example site authenticator 330 may implement means for determining whether a request accessed at a network node 110, 112, 114 indicates that a user has authorized the request to be transmitted to a destination site 118.

The example exception list datastore 340 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example exception list datastore 340 may be in any data format such as, for example, binary data, comma delimited data, tab delimited data, structured query language (SQL) structures, etc. While, in the illustrated example, the exception list datastore 340 is illustrated as a single device, the example exception list datastore 340 and/or any other data storage devices described herein may be implemented by any number and/or type(s) of memories. In the illustrated example of FIG. 3, the example exception list datastore 340 stores an exception list including URL(s) of sites that users have authorized. In some examples, the URL(s) in the example exception list datastore 340 are stored in association with the users that authorized those sites to prevent one user from authorizing a domain that might be malicious, inadvertently allowing other users to navigate to the potentially malicious domain.

The example URL encoder 350 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. If a URL for the intermediary page has not yet been encoded, the URL encoder 350 creates a URL for the intermediary page 135 using the domain of the destination page 118 and information from the nodes 110, 112, 114. The URL will be provided to following network security monitors to indicate that a user has authorized the destination URL. The intermediary URL, is encoded with a hash to protect the information to be transmitted (e.g., a destination URL) from tampering by a malicious third party. The example URL encoder 350 may implement means for calculating a second token based on a domain of the destination site and a key.

The example URL analyzer 360 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The URL analyzer 360 determines whether a URL for an intermediary page 135 exists in the requested site URL. In the examples disclosed herein, the URL analyzer 360 determines whether the URL for the intermediary page 135 exists using an examination of the lower-level domain names in destination site URL. If the URL analyzer 360 determines that an intermediary page URL exists in the destination site URL, the example URL analyzer prompts the hash validator 320 to compute the hash of the requested URL to prepare for redirection to an intermediary page. If the URL analyzer 360 determines that an intermediary page URL does not exist in the destination site URL, the URL analyzer 360 prompts the site authenticator 330 to determine whether the destination site will be blocked. The example URL analyzer 360 may implement means for extracting a first token included in a destination page request.

The example network page blocker 370 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. If the example site verifier 230 determines that the destination site 118 should be blocked the network page blocker 370 prevents site access. The network page blocker 370 causes a separate block page to be displayed to allow the user to authorize the requested destination site 118 for the network security monitor 130. In some examples, in response to an authorization by a user on the block page, the example site redirector 210 will direct the authorization request to an intermediary page 135.

Figure 4:
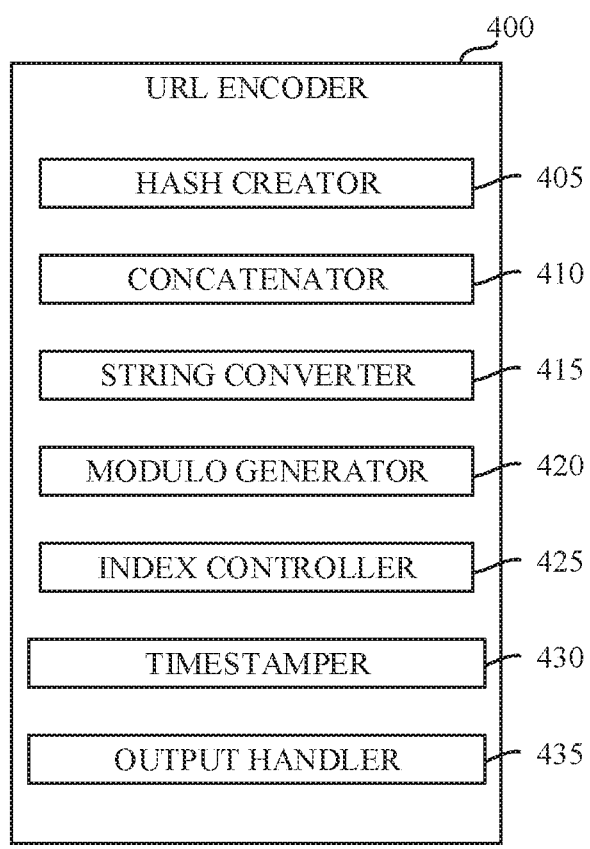
FIG. 4 is a block diagram of an example implementation of the example uniform resource locator (URL) encoder of the illustrated examples of FIGS. 2 and/or 3.

FIG. 4 is a block diagram of an example implementation of the example URL encoder 400 of the illustrated examples of FIGS. 2 and/or 3. The example URL encoder 400 of the illustrated example of FIG. 4 includes a hash creator 405, a concatenator 410, a string converter 415, a modulo generator 420, an index controller 425, a timestamper 430, and an output handler 435.

The example hash creator 405 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example hash creator 405 executes a one-way cryptographic hash function to create hashes of data. This process ensures integrity of the transmitted data and that the transmission originates from a trusted source because the hashed data includes a secret key shared between trusted security monitors and because a hash of a dataset results in the same value whenever the hash is calculated. The hashes are used to confirm that the requested URL of the intermediary page originates from a trusted device security monitor 125 or network security monitor 130. In some examples, the example hash creator 405 receives data from the example device security monitor 125. In some examples, the example hash creator 405 receives data from the network security monitor 130. In examples disclosed herein, the code utilizes the SHA256 hash function. The example hash creator 405 may store the hash function code in memory.

The example concatenator 410 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example concatenator 410 retrieves a secret key stored in memory of the client device 105. This secret key is only known to security monitors operating in the example system. In examples disclosed herein, the secret key is a string. However, any other data type may additionally or alternatively be used as the secret key. The example concatenator 410 concatenates a hash and the secret key. In examples disclosed herein, the example concatenator 410 appends the secret key to the hash. However, the secret key and the hash may be combined in any other fashion.

The example string converter 415 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example string converter 415 converts a hash to a custom base character string. In examples disclosed herein, the custom base character string is a base32 character string. In examples disclosed herein, the base32 character string utilizes a 32-character set including the 26 upper-case letters A-Z and the digits 0-5. However, in some examples, lower-case letters, or digits other than 0-5 could additionally or alternatively be used. For example, because domain names are not case-sensitive, lower case letters could alternatively be used.

The example modulo generator 420 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example modulo generator 420 of the illustrated example of FIG. 4 executes a modulo operation. In examples disclosed herein, the modulo operation is a function that returns the remainder after division of two terms. The dividend represents the amount of characters in a string of data, and the divisor represents an index counter. The modulo operation is used to identify and select characters in a hash string to be combined into a portion of the domain of the intermediary page request.

The example index controller 425 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example index controller 425 controls the manipulation of request data strings into an encoded URL. In some examples, the example index controller 425 may replace, add and/or omit characters. In some examples, the example index controller 425 may initialize and/or update the counter variable to control the length of the encoded URL and calculations to create the encoded URL. In some examples, the example index controller 425 may determine the length of the string. In some examples, the example index controller 425 may indicate the specific index to select the character of the string.

In examples disclosed herein, the output string is manipulated by the example index controller 425 by storing selected character as the first character to the output string. However, the selected character may be included in the output string in any other fashion. For example, the selected character may be appended to the output string.

The example timestamper 430 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example timestamper 430 calculates the timestamp for use in the destination URL domain. The timestamp is calculated from hours since Jan. 1, 2018 based on UTC. This UTC-based time calculation produces a four or five digit number. In some examples, other time standards may be additionally or alternatively be used. For example, UNIX timestamps, such as epoch time, utilize a ten digit number. Additionally, other initialization times (e.g., instead of Jan. 1, 2018), may additionally or alternatively be used.

The example output handler 435 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example output handler 435 regulates the decision points of the machine-readable instructions to determine the string to output as the encoded URL. In some examples, the example output handler 435 determines the succeeding instruction based on the preceding instruction's output.

Figure 5:
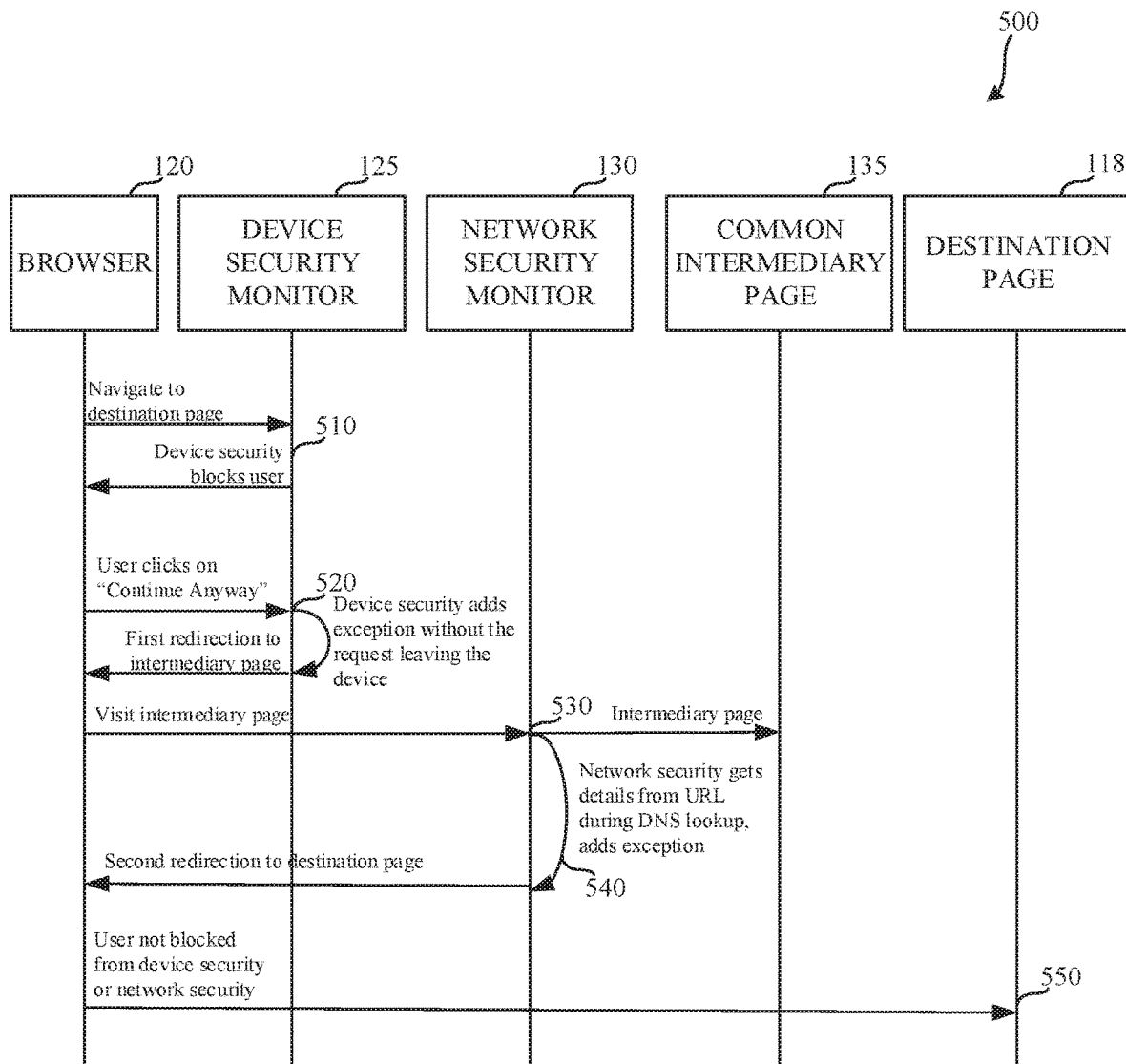
FIG. 5 is an example communication diagram representing a scenario in which the device security monitor is the first monitor to block navigation to a destination page.

FIG. 5 is an example communication diagram representing a scenario in which the device security monitor 125 is the first monitor to block navigation to a destination page 118. The example chain of communication begins with the example browser 120 sending an access request for the destination page 118 to the example device security monitor 125. (Point 510). The device security monitor 125 blocks this request by returning the contents of the block page and prompts the browser 120 to ask the user to authorize the destination page 118. When the user authorizes the destination site 118, the example device security monitor 125 adds an exception to blocking that destination page 118 and redirects the browser to send a redirected request to an intermediary page 135 (Point 520).

In response to the redirection message, the example browser 120 sends a redirected request to the intermediary page 135. The device security monitor 125 allows this request and passes the request to the example network security monitor 130. The network security monitor 130 processes the intermediary URL and adds an exception for the destination page 118. (Point 530). The network security monitor 130 subsequently allows access to the intermediary page 135. The intermediary page 135 then sends a second redirection message to the browser to the destination page 118. (Point 540). The access request to the destination page 118 is allowed by the device security monitor 125 and the network security monitor 130. (Point 550).

Figure 6:
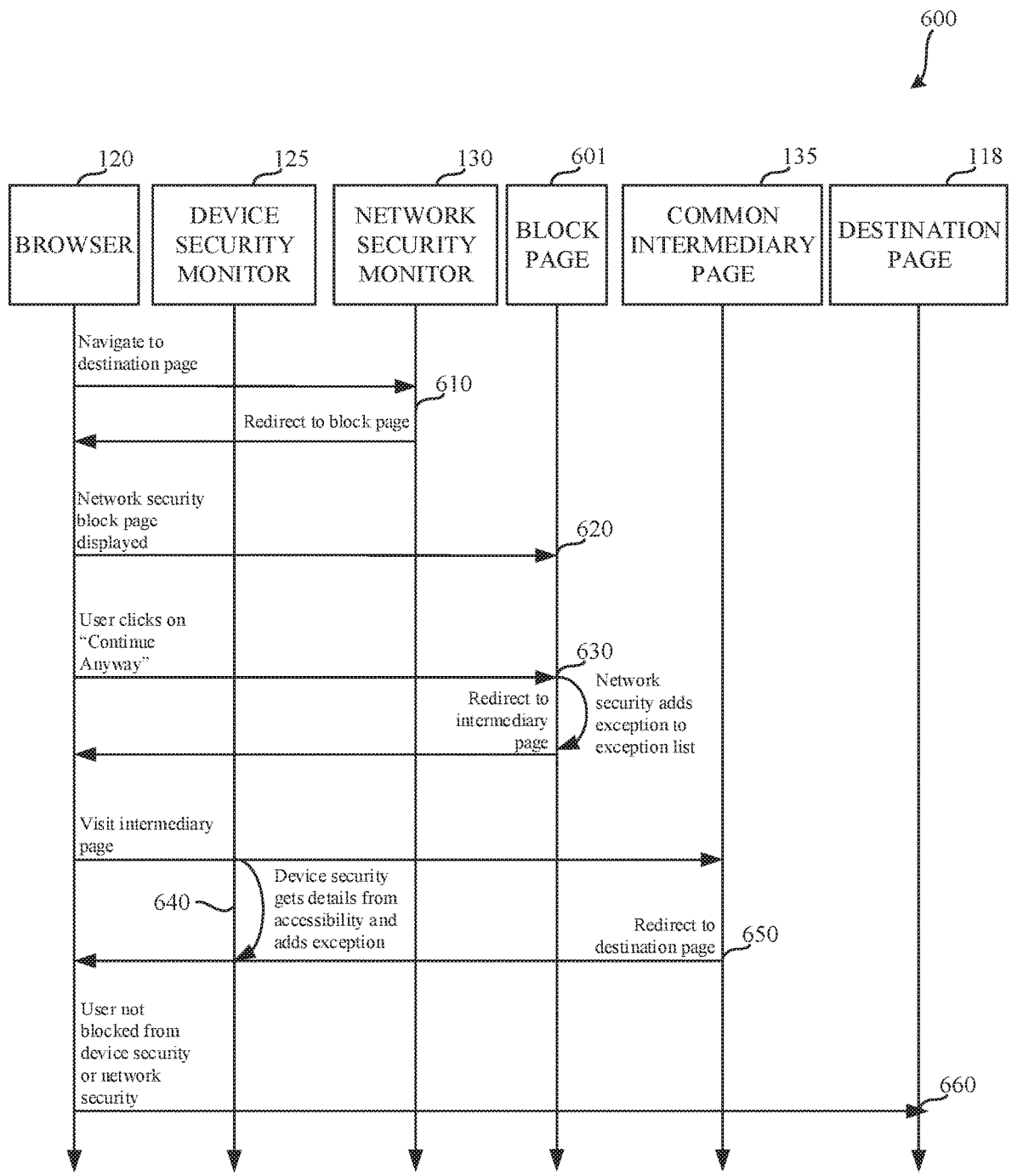
FIG. 6 is an example communication diagram representing a scenario in which the network security monitor is to block navigation to a destination page.

FIG. 6 is an example communication diagram representing a scenario in which the network security monitor 130 is the first monitor to block navigation to a destination page 118. The example chain of communication begins with the example browser 120 sending a first access request for the destination page 118 to the example device security monitor 125. The device security monitor 125 allows this request and passes it to the network security monitor 130, which blocks this request. (Point 610). The network security monitor 130 redirects to a network block page 601, which causes the user to be prompted to authorize the access to the destination page 118. (Point 620). When the user authorizes the destination site 118, the network block page 601 adds an exception to blocking that destination page 118 and redirects to an intermediary page 135. (Point 630).

In response to the redirection message, the example browser 120 sends a request to access the intermediary page 135. If the request contains a intermediate page with a valid encoded URL, the device security monitor 125 determines that a user authorized the destination page and processes the intermediary URL to add an exception for the destination page 118 using the exception list datastore 240. (Point 640). The device security monitor 125 then allows the request and passes the request to the network security monitor 130. The network security monitor 130 determines that the request contains an intermediary page 135 and does not send a redirect request to a block page. The intermediary page 135 then sends a second redirection message to the browser to the destination page 118. (Point 650). The access request to the destination page 118 is allowed by the device security monitor 125 and the network security monitor 130. (Point 660).

While example manners of implementing the example device security monitor 125 and/or the example network security monitor 130 are illustrated in FIGS. 1, 2, 3, and/or 4, one or more of the elements, processes and/or devices illustrated in FIGS. 1, 2, 3, and/or 4 may be combined, divided, re-arranged, omitted, eliminated and/or implemented in any other way. Further, the example site redirector 210, the example site verifier 230, the example URL encoder 250, and/or, more generally, the example device security monitor 125 of FIGS. 1 and/or 2, the example site redirector 310, the example hash validator 320, the example site authenticator 330, the example URL encoder 350, the example URL analyzer 360, the example network page blocker 370, and/or, more generally, the example network security monitor 130 of FIGS. 1 and/or 3, the example hash creator 405, the example concatenator 410, the example string converter 415, the example modulo generator 420, the example index controller 425, the example timestamper 430, the example output handler 435, and/or, more generally, the example URL encoder 400 of FIG. 4 (which may be used to implement the example URL encoder 250 or the example URL encoder 350 of FIGS. 2 and/or 3, respectively) may be implemented by hardware, software, firmware and/or any combination of hardware, software and/or firmware. Thus, for example, any of the example site redirector 210, the example site verifier 230, the example URL encoder 250, and/or, more generally, the example device security monitor 125 of FIGS. 1 and/or 2, the example site redirector 310, the example hash validator 320, the example site authenticator 330, the example URL encoder 350, the example URL analyzer 360, the example network page blocker 370, and/or, more generally, the example network security monitor 130 of FIGS. 1 and/or 3, the example hash creator 405, the example concatenator 410, the example string converter 415, the example modulo generator 420, the example index controller 425, the example timestamper 430, the example output handler 435, and/or, more generally, the example URL encoder 400 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example site redirector 210, the example site verifier 230, the example URL encoder 250, and/or, more generally, the example device security monitor 125 of FIGS. 1 and/or 2, the example site redirector 310, the example hash validator 320, the example site authenticator 330, the example URL encoder 350, the example URL analyzer 360, the example network page blocker 370, and/or, more generally, the example network security monitor 130 of FIGS. 1 and/or 3, the example hash creator 405, the example concatenator 410, the example string converter 415, the example modulo generator 420, the example index controller 425, the example timestamper 430, the example output handler 435, and/or, more generally, the example URL encoder 400 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example device security monitor 125 or the example network security monitor 130 of FIGS. 1, 2 and/or 3 may include one or more elements, processes and/or devices in addition to, or instead of, those illustrated in FIGS. 1, 2, 3, and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
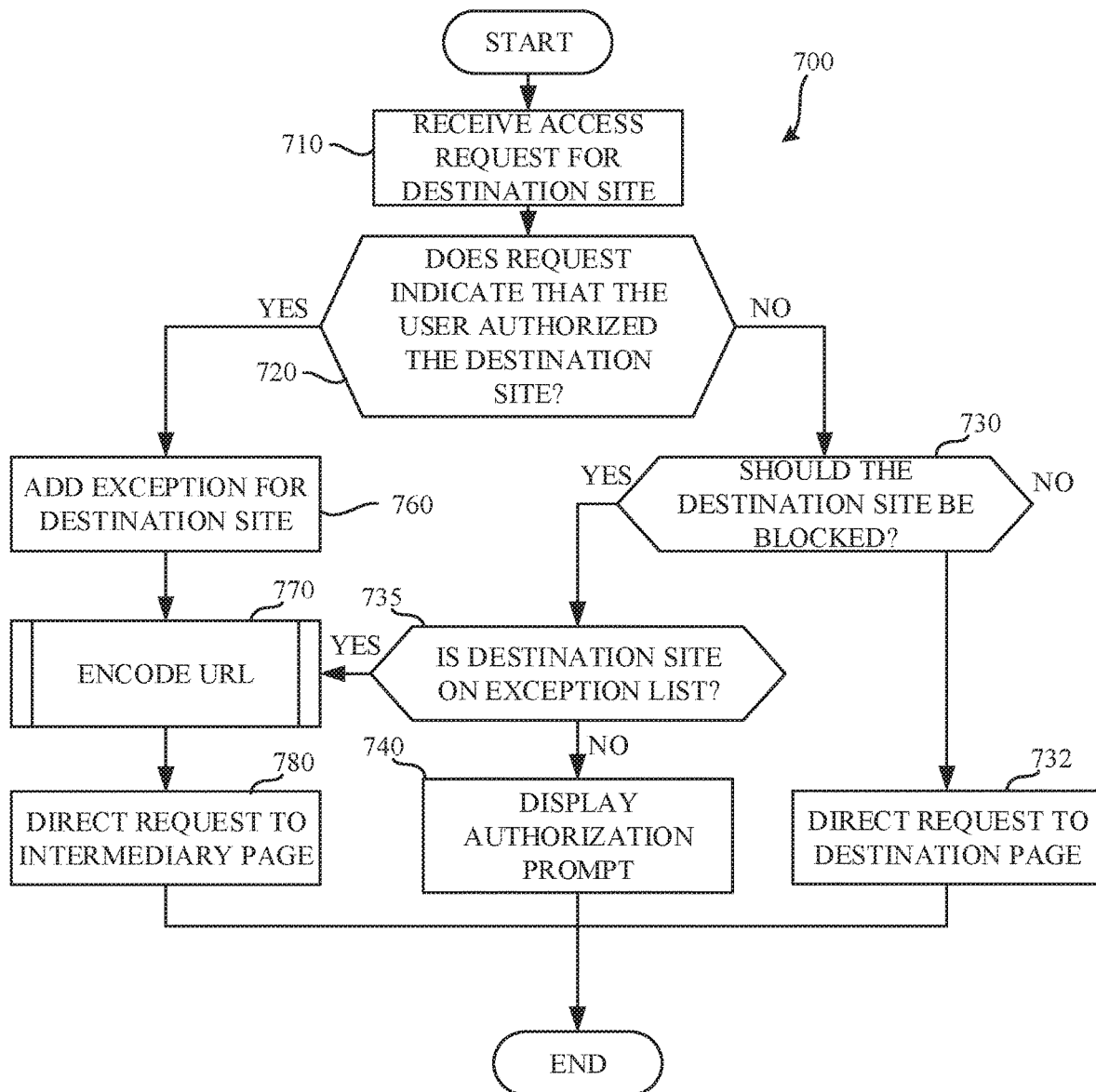
FIG. 7 is a flowchart representative of example machine-readable instructions that may be executed to implement the example device security monitor of FIGS. 1 and/or 2.
Figure 8:
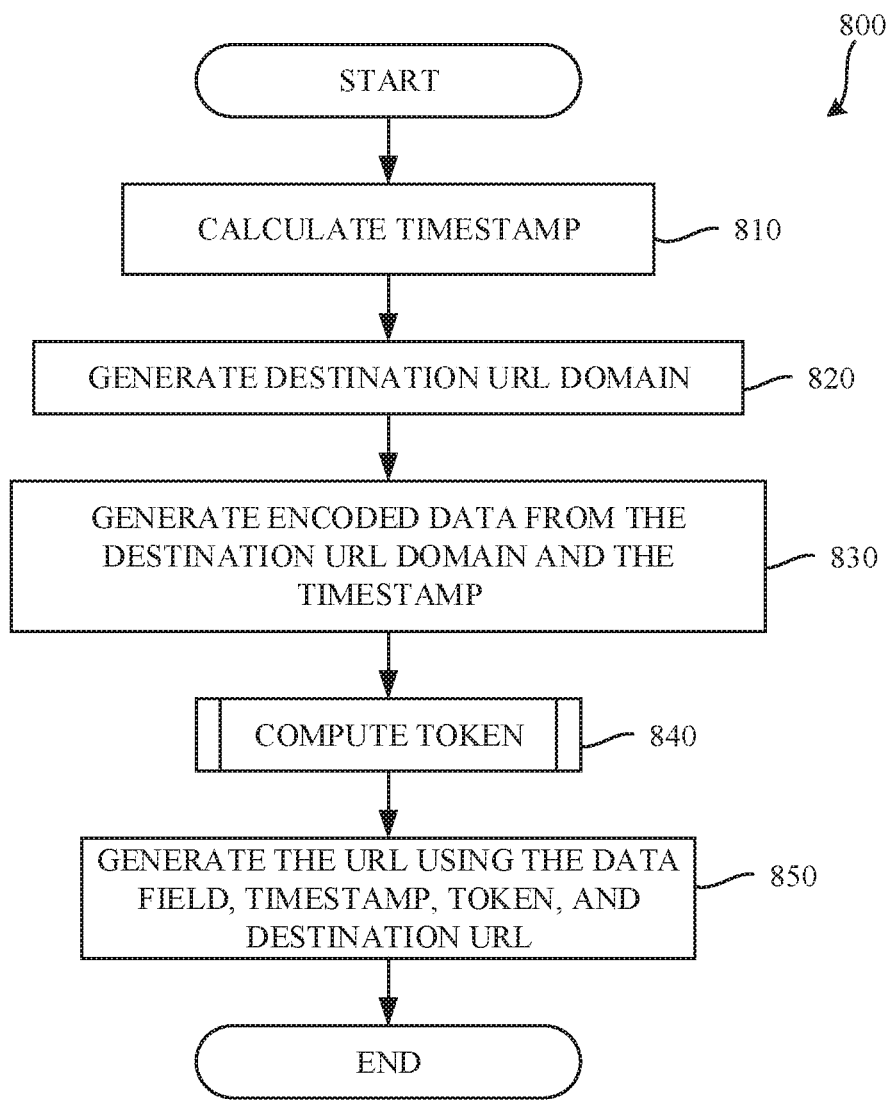
FIG. 8 is a flowchart representative of example machine-readable instructions that may be executed to implement the example device security monitor of FIGS. 1 and/or 2 to encode a URL.
Figure 9:
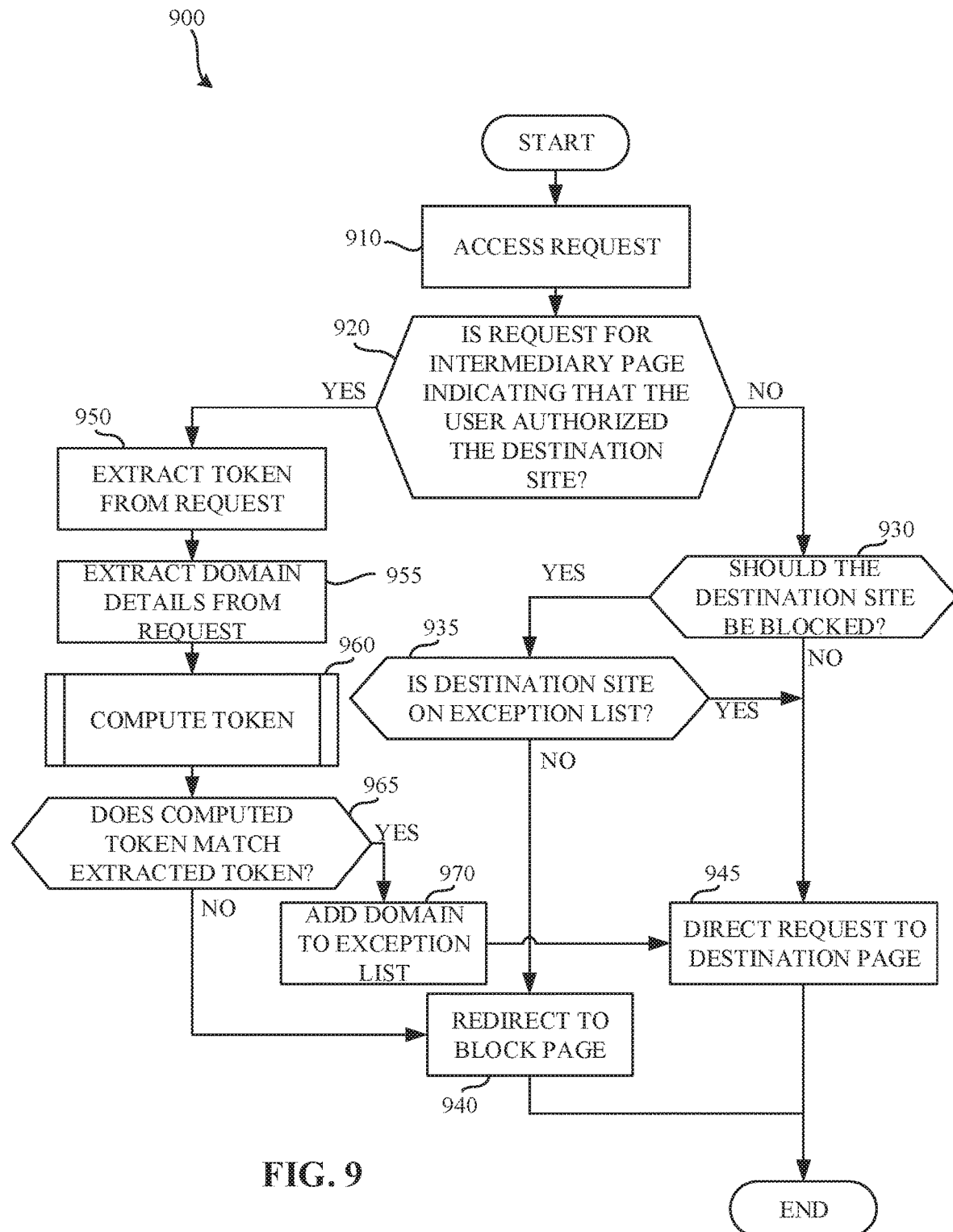
FIG. 9 is a flowchart representative of example machine-readable instructions that may be executed to implement the example network security monitor of FIGS. 1 and/or 3.

Flowcharts representative of example hardware logic, machine readable instructions, hardware implemented state machines, and/or any combination thereof for implementing the example device security monitor 125 and/or the example network security component 130 of FIGS. 1, 2, 3, and/or 4 are shown in FIGS. 7, 8, 9, and/or 10. The machine readable instructions may be one or more executable programs or portion(s) of an executable program for execution by a computer processor such as the processor 1112, 1112 shown in the example processor platform 1100, 1200 discussed below in connection with FIGS. 11 and/or 12. The program may be embodied in software stored on a non-transitory computer readable storage medium such as a CD-ROM, a floppy disk, a hard drive, a DVD, a Blu-ray disk, or a memory associated with the processor 1112, 1212, but the entire program and/or parts thereof could alternatively be executed by a device other than the processor 1112, 1212 and/or embodied in firmware or dedicated hardware. Further, although the example program is described with reference to the flowchart illustrated in FIGS. 7, 8, 9, and/or 10, many other methods of implementing the example device security monitor 125 and/or the example network security component 130 of FIGS. 1, 2, 3, and/or 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7, 8, 9, and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of example machine-readable instructions that may be executed to implement the example device security monitor 125 of FIGS. 1 and/or 2. The example process 700 of FIG. 7 begins when the example device security monitor 125 receives an access request for a destination website. (Block 710). In examples disclosed herein, the request is sent from the browser 120 of FIG. 1. However, the request may be sent from any other originating source (e.g., an application other than the browser 120). The example site verifier 230 inspects the request to determine if the request indicates that the user authorized navigation to the destination site. (Block 720). The example site verifier 230 determines that the user has authorized navigation to the requested site when the site URL is for the intermediary page 135. The user may indicate their authorization (e.g., an indication that the user has accepted the risk of navigating to a potentially malicious website) by, for example, clicking on a link in a prompt displayed via a user interface of the client device 105. Such prompt should, ordinarily, only have been displayed if the site was not previously identified in the exception list stored by the client device 105.

If the request does not indicate that the user has authorized navigation to the destination site (e.g., block 720 returns a result of NO), the example site verifier 230 determines whether the destination site should be blocked. (Block 730). In examples disclosed herein, the example site verifier 230 determines whether the destination site should be blocked by consulting, for example, a list of known malicious sites. However, any other approach for determining whether a destination site should be blocked may additionally or alternatively be used. If the example site verifier 230 determines that the destination site 118 should not be blocked (e.g., block 730 returns a result of NO), the example site redirector 210 directs the request to the destination page 118. (Block 732).

If the example site verifier 230 determines that the destination site 118 should be blocked (e.g., block 730 returns a result of YES), the example site verifier 230 determines whether the destination site 118 is already present on the exception list. (Block 735). If the destination site 118 is not on the exception list (e.g., block 735 returns result of NO), the example site verifier 230 causes an authorization prompt to be displayed to the user. (Block 740).

Returning to block 720, if the request indicates that the user has authorized navigation to the destination site 118 (e.g., block 720 returns a result of YES), the example site verifier 230 adds an exception for the destination site to the example exception list stored in the exception list datastore 240. (Block 760). After adding the destination site 118 to the exception list (Block 760) or determining that the destination site 118 is already on the exception list datastore 240 (e.g., block 735 returns result of YES) the example URL encoder 250 encodes the URL. (Block 770). An example approach for encoding a URL is disclosed further detail in connection with FIG. 8. The example site redirector 210 directs the request to an intermediary page 135 using the encoded URL. (Block 780). In this manner, the intermediary page 135 enables the device security monitor 125 to relay information to the network security monitor 130 indicating that the user has authorized the navigation to the destination site 118 (or that the site was already present on the exception list at the device security monitor 125. The example process 700 of FIG. 7 then terminates, but may be re-executed upon, for example, the user interface (e.g., a browser, application, etc.) sending an access request for a different site.

FIG. 8 is a flowchart representative of example machine-readable instructions that may be executed to implement the example device security monitor 125 of FIGS. 1 and/or 2 to encode a URL. The example process 800 of FIG. 8 begins when the example timestamper 430 calculates a timestamp. (Block 810). The timestamp is calculated from hours since Jan. 1, 2018, based on UTC. This calculation based on UTC time produces a four or five-digit number. In some examples, other time standards may be additionally or alternatively be used. For example, UNIX timestamps, such as epoch time, utilize a ten-digit number. Additionally, other initialization times (e.g., instead of Jan. 1, 2018), may additionally or alternatively be used.

The example string converter 415 generates the destination URL domain of the URL from the example site verifier 230. (Block 820). In examples disclosed herein, one or more domain separators (e.g., a '.' separator appearing within a domain name) is converted to two underscores to generate the destination URL domain. However, any other character and/or sequence of characters may be used to replace the domain separators. In some examples, the string converter 415 truncates the destination URL domain to a threshold number of characters (e.g., 40 characters).

The example concatenator 410 generates an encoded data field from the calculated timestamp from block 810 and the generated destination URL domain from block 820. (Block 830). In examples disclosed herein, the example concatenator 410 appends the timestamp to the destination URL domain. The concatenation produces the encoded data field with a maximum of 50 characters total (e.g., up to 40 characters from the destination URL domain, and 10 characters from the timestamp). However, the timestamp and the destination URL domain may be combined in any other fashion.

The example URL encoder 350 computes a token (Block 840). An example process for calculating a token is disclosed in further detail in FIG. 10.

The example concatenator 410 concatenates the encoded data field generated from block 830, the token computed from block 840, and the URL from the example site verifier 230. (Block 850). The example concatenator 410 appends the encoded data and/or token in the following manner: "Encoded-DataField+token.pt.mcafee.com/?destURL= completeDestinationURL" However, any other format for combining the encoded data field and the token to create a URL may additionally or alternatively be used. The example process 800 of FIG. 8 then terminates, and control returns to block 780 of FIG. 7.

FIG. 9 is a flowchart representative of example machine-readable instructions that may be executed to implement the example network security monitor of FIGS. 1 and/or 3. The example process 900 of FIG. 9 begins when the example network security monitor 130 receives an access request for a specific destination website. (Block 910). In examples disclosed from herein, the request is sent from the browser 120 of FIG. 1. However, the request may be sent from any other originating source (e.g., an application other than the browser 120). The example URL analyzer 360 inspects the request to determine if the request is for the intermediary page 135, indicating that the user authorized navigation to the destination site. (Block 920).

If their request does not indicate that the request is for the intermediary page 135 and the user has authorized navigation to the destination site (e.g., block 920 returns a result of NO), the example site authenticator 330 determines whether the destination site should be blocked. (Block 930). In examples disclosed herein, the example site authenticator 330 determines whether the destination site 118 should be blocked by consulting, for example, a list of known malicious sites. However, any other approach for determining whether a destination site should be blocked may additionally or alternatively be used. If the example site authenticator 330 determines that the destination site 118 should not be blocked (e.g., block 930 returns a result of NO), the example site redirector 310 directs the request to the destination page 118. (Block 945).

If the example site authenticator 330 determines the destination site should be blocked (e.g., block 930 returns a result of YES), the example site authenticator 330 determines whether the destination site is already present on the exception list. (Block 935). If the destination site is not on the exception list (e.g., block 935 returns result of NO), the example network page blocker 370 prevents access to the destination page 118. (Block 940). If the destination site is already on the exception list datastore 340 (e.g., block 935 returns a result of YES), the example site redirector 310 directs the request to the destination page 118. (Block 945).

Returning to block 920, if the request is for the intermediary page 135, indicating that the user has authorized navigation to the destination site 118 (e.g., block 920 returns a result of YES), the example URL analyzer 360 extracts a token from the URL of the requested intermediary page 135. (Block 950). The example URL analyzer 360 then extracts domain details for the example destination site 118 from the URL of the requested intermediary page 135. (Block 955). The example hash validator 320 computes the token (Block 960). An example process for calculating a token is disclosed in further detail in FIG. 10, below.

The example hash validator 320 then inspects the extracted token and the computed token (Block 965). If the computed token does not match the extracted token (e.g., block 965 returns a result of NO), the example network page blocker 370 prevents access to the destination page 118 (Block 940).

If the computed token matches the extracted token (e.g., block 965 returns YES), the example site authenticator 330 adds an exception for the destination site 118 to the example exception list datastore 340. (Block 970). The site redirector 310 then directs the request to the destination page 118. (Block 945). The example process 900 of FIG. 9 then terminates, but may be re-executed upon, for example, the user interface (e.g., a browser, application, etc.) sending an access request for a different site.

Figure 10:
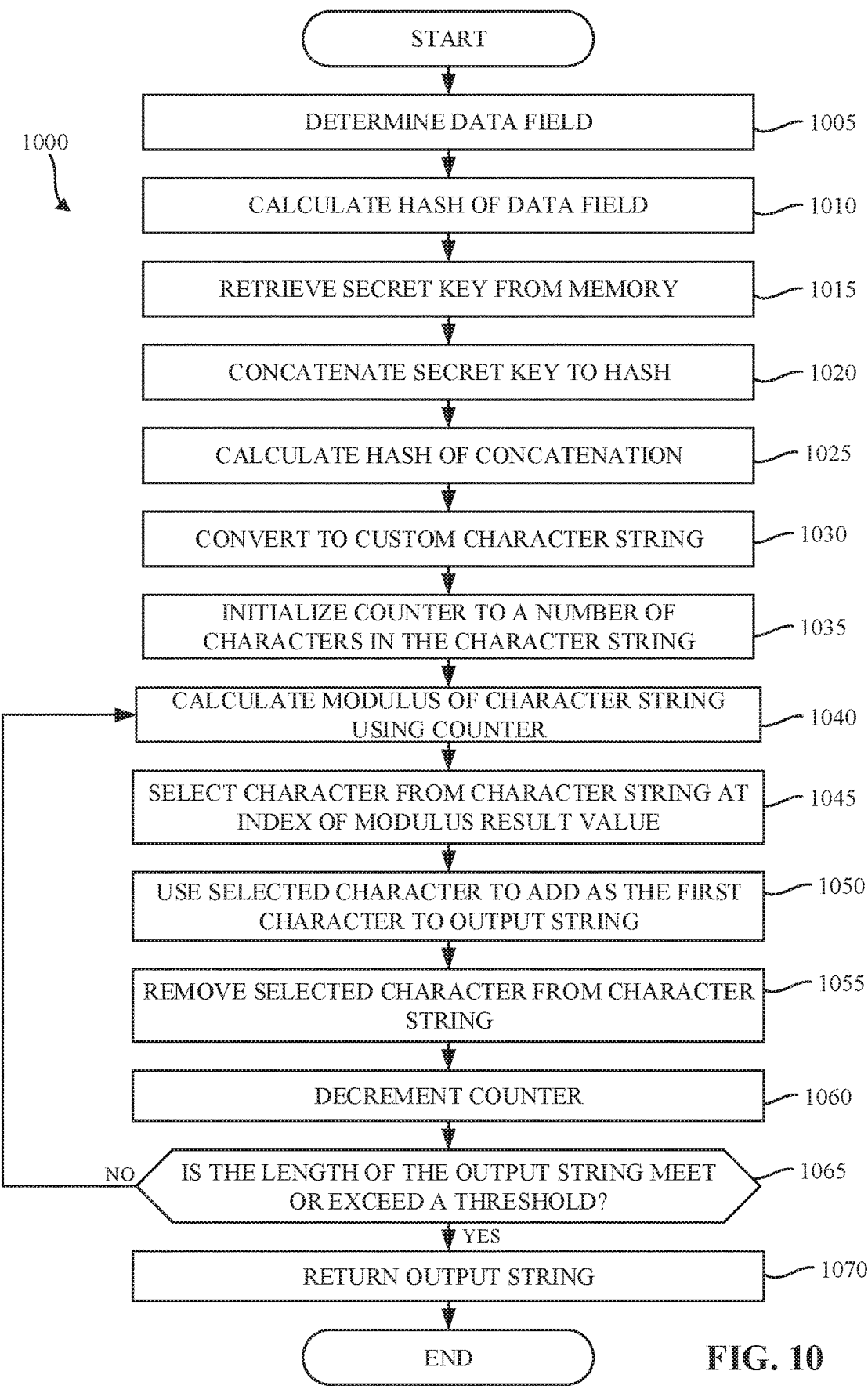
FIG. 10 is a flowchart representative of example machine-readable instructions that may be executed to implement the example URL encoder of FIGS. 2, 3, and/or 4.

FIG. 10 is a flowchart representative of example machine-readable instructions that may be executed to implement the example URL encoder of FIGS. 2, 3, and/or 4. The example process 1000 of the illustrated example of FIG. 10 begins when the example hash creator 405 identifies the data field portion of a domain in a received and/or transmitted request. (Block 1005). In examples disclosed herein, the data field is derived from a portion of a domain label from the request. For example, because the domain label has a maximum of 63 characters, with 13 characters being reserved for the token, the maximum character length of the data field is 50 characters. In some examples, 40 characters of the data field are reserved for the domain and 10 characters are reserved for the timestamp. In some examples, a domain label may include less than 63 characters. In such an example, the data field is determined as the portion of the domain label excluding the 13 characters corresponding to the token.

The example hash creator 405 generates a first hash of the data field using the data field. (Block 1010). In examples disclosed herein, the first hash is created using a SHA256 algorithm. However, any other hash algorithm may additionally or alternatively be used such as, for example, Streebog. Using a cryptographic function, such as SHA256, ensures the integrity of transmitted data. In some examples, binary-to-text encoding schemes may additionally or alternatively be used to create the first hash. For example, binary-to-text encoding schemes such as base85, base91, to A, etc. may additionally or alternatively be used.

The example concatenator 410 retrieves a secret key stored in memory of the client device 105. (Block 1015). This secret key is only known to security monitors operating in the example system. In examples disclosed herein, the secret key is a string. However, any other data type may additionally or alternatively be used as the secret key.

The example concatenator 410 concatenates the example first hash (computed at block 1010) and the example secret key (retrieved at block 1015). (Block 1020). In examples disclosed herein, the example concatenator 410 appends the secret key to the first hash. However, the secret key and the first hash may be combined in any other fashion.

The example hash creator 405 calculates a second hash of the concatenation (determined at block 1020). (Block 1025). In examples disclosed herein, the second hash is created using a SHA256 algorithm. However, any other hash algorithm may additionally or alternatively be used such as, for example, Streebog. Using a cryptographic function, such as SHA256, ensures the integrity of transmitted data. In some examples, binary-to-text encoding schemes may additionally or alternatively be used to create the first hash. For example, binary-to-text encoding schemes such as base85, base91, Btoa, etc. may additionally or alternatively be used.

The example string converter 415 converts the second hash (calculated at block 1025) to a custom base character string. (Block 1030). In examples disclosed herein, the character string is converted to a base32 character string. In examples disclosed herein, the base32 character string utilizes a 32-character set including the 26 upper-case letters A-Z and the digits 0-5. However, in some examples, lower-case letters, or digits other than 0-5 could additionally or alternatively be used. For example, because domain names are not case-sensitive, lower case letters could alternatively be used.

The example index controller 425 initializes a counter to a value representative of the number of characters in the character string. (Block 1035). In examples disclosed herein, the character string is expected to have 53 characters. As a result, in examples disclosed herein, the counter is initialized to 53.

The example modulo generator 420 executes a modulo operation of the character string, divided by the value of the counter. (Block 1040). In examples disclosed herein, the modulo operation is a function that returns the remainder after division of two terms. The dividend represents the amount of characters in the string, and the divisor represents the counter.

The example index controller 425 selects a character from the character string based on the result from the calculated modulus in block 1040. (Block 1045). In examples disclosed herein, the value from block 1035 is used as the index to find a specific character within the character string.

The example index controller 425 modifies an output string to include the selected character. (Block 1050). In examples disclosed herein, the output string is manipulated by the example index controller 425 by storing selected character as the first character to the output string. However, the selected character may be included in the output string in any other fashion. For example, the selected character may be appended to the output string.

The example index controller 425 modifies the character string to remove the selected character from the character string. (Block 1055). That is, the character selected from block 1045 is omitted from the character string.

The example index controller 425 decrements the counter value. (Block 1060). The example index controller 425 determines whether a length of the output string meets or exceeds a threshold. (Block 1065). In examples disclosed herein, the threshold is thirteen characters, representative of the expected length of the token. However, any other length of token may additionally or alternatively be used. If the length of the output string is less than the threshold (e.g., block 1065 returns result of NO), control returns to block 1040, where the example process of blocks 1040 through 1065 are repeated, thereby continually selecting a character for inclusion in the output string based on a modulus operation.

Upon the example index controller 425 determining that the length of the output string meets or exceeds the threshold (e.g., block 1065 returns a result of YES), the example output handler 435 returns the output string. (Block 1070). The example process 1000 of the illustrated example of FIG. 10 then terminates. The example process 1000 of the illustrated example of FIG. 10 may be repeated upon, for example, when products may validate the data by re-computing the hash to encode the URL.

Figure 11:
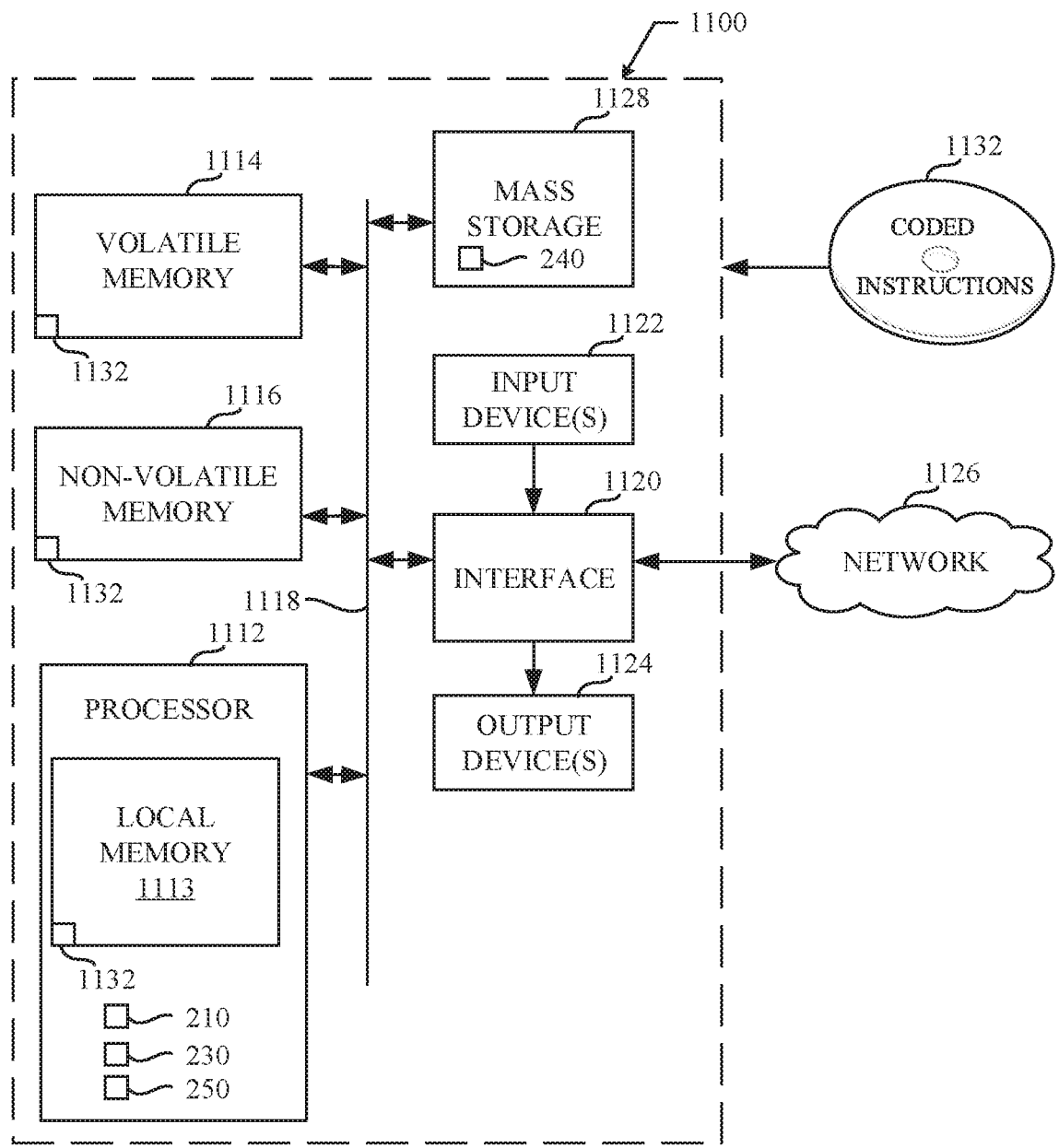
FIG. 11 is a block diagram of an example processing platform structured to execute the instructions of FIGS. 7, 8, and/or 10 to implement the example device security monitor of FIG. 1.

FIG. 11 is a block diagram of an example processor platform 1100 structured to execute the instructions of FIGS. 7, 8, and/or 10 to implement the device security monitor 125 of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example device security monitor 125.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller. The example processor 1112 implements the example site redirector 210, the example site verifier 230, and the example URL encoder 250.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 7, 8, and/or 10 may be stored in the mass storage device 1128, in the volatile memory 1114, in the non-volatile memory 1116, and/or on a removable non-transitory computer readable storage medium such as a CD or DVD. The example mass storage device 1128 implements the example exception list datastore 240.

Figure 12:
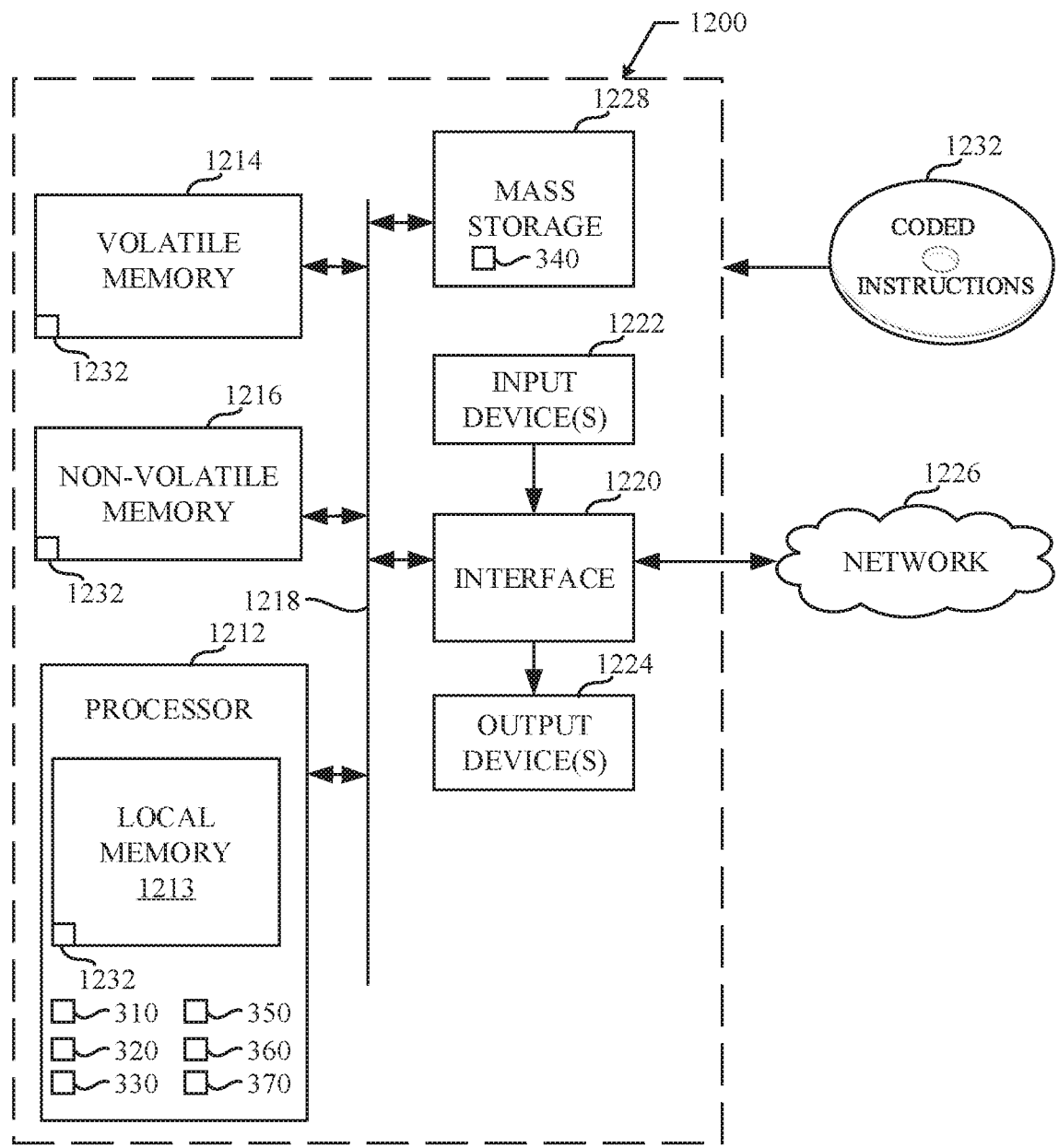
FIG. 12 is a block diagram of an example processing platform structured to execute the instructions of FIGS. 9 and/or 10 to implement the example network security monitor of FIG. 1.

FIG. 12 is a block diagram of an example processor platform 1200 structured to execute the instructions of FIGS. 9 and/or 10 to implement the network security monitor 130 of FIGS. 1 and/or 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network security monitor 130.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller. The example processor 1212 implements the example site redirector 310, the example hash validator 320, the example site authenticator 330, the example URL encoder 350, the example URL analyzer 360, and the example network page blocker 370.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 9 and/or 10 may be stored in the mass storage device 1228, in the volatile memory 1214, in the non-volatile memory 1216, and/or on a removable non-transitory computer readable storage medium such as a CD or DVD. The example mass storage device 1228 implements the example exception list datastore 340.

From the foregoing, it will be appreciated that example methods, apparatus, and articles of manufacture have been disclosed that enable deconfliction of user prompts to visit a potentially malicious website by passing acknowledgment information between security monitors. Such an approach enables information such as user choices (e.g., a user choice to visit a potentially malicious website) to be passed forward and prevent the user from being prompted multiple times. Thus, if a user made a choice in response to a prompt by the security monitor of the client device, such information is provided to subsequent network nodes, enabling those subsequent network node(s) to determine whether to display a prompt at least partially based on the user selection. Such an approach provides an enhanced user experience, as users are not asked multiple times whether they wish to visit a potentially malicious site. Moreover, such an approach is more computationally efficient than other approaches, as such an approach does not rely on a centralized exception database to track and synchronize such information. Disclosed methods, apparatus and articles of manufacture are accordingly directed to one or more improvement(s) in the functioning of a computer and/or a network.

Example methods, apparatus, systems, and articles of manufacture to deconflict malware or content remediation are disclosed herein. Further examples and combinations thereof include the following:

Example 1 includes an apparatus to deconflict user authorization to navigate to a website, the apparatus comprising a site redirector to identify a first request to be transmitted from a client device to a destination site identified by a uniform resource locator (URL), a site verifier to determine whether the first request indicates that a user has authorized navigation to the destination site, and a URL encoder to, in response to determining that the user has authorized the navigation to the destination site, generate a data field based on an address of a domain of the destination site, the site redirector to transmit a second request to a network security monitor, the second request to indicate to the network security monitor that the user has authorized the navigation to the destination site, the second request including the data field and the URL.

Example 2 includes the apparatus of example 1, further including an exception list datastore, wherein the site verifier is to, in response to determining that the user has authorized the navigation to the destination site, add an identifier of the domain of the destination site to the exception list datastore.

Example 3 includes the apparatus of example 1, wherein the site verifier is to, in response to determining that the user has not authorized the navigation to the destination site, determine whether the first request is to be blocked.

Example 4 includes the apparatus of example 3, wherein the site redirector is to, in response to determining that the first request should be blocked, cause a prompt to be displayed requesting the user to authorize the navigation to the destination site.

Example 5 includes the apparatus of example 3, wherein the site redirector is to, in response to determining that the first request should not be blocked, transmit the first request to the destination site.

Example 6 includes at least one non-transitory computer-readable storage medium comprising instructions that, when executed, cause at least one processor to at least identify a first request to be transmitted from a client device to a destination site identified by a uniform resource locator (URL), determine whether the first request indicates that a user has authorized navigation to the destination site, in response to determining that the user has authorized the navigation to the destination site, generate a data field based on an address of a domain of the destination site, and transmit a second request to a network security monitor, the second request to indicate to the network security monitor that the user has authorized the navigation to the destination site, the second request including the data field and the URL.

Example 7 includes the at least one non-transitory computer readable medium of example 6, wherein the instructions, when executed, further cause the at least one processor to add, in response to determining that the user has authorized the navigation to the destination site, an identifier of the domain of the destination site to an exception list.

Example 8 includes the at least one non-transitory computer readable medium of example 6, wherein the instructions, when executed, further cause the at least one processor to determine whether the first request should be blocked.

Example 9 includes the at least one non-transitory computer readable medium of example 8, wherein the instructions, when executed, further cause the at least one processor to cause, in response to determining that the first request should be blocked, a prompt to be displayed requesting the user to authorize the navigation to the destination site.

Example 10 includes the at least one non-transitory computer readable medium of example 8, wherein the instructions, when executed, further cause the at least one processor to transmit, in response to determining that the first request should not be blocked, the first request to the destination site.

Example 11 includes the at least one non-transitory computer readable medium of example 6, wherein the instructions, when executed, further cause the at least one processor to generate the data field by calculating a timestamp of the first request, encoding the timestamp and the domain of the destination site, computing a token of the encoded timestamp, the encoded domain of the destination site, and a key, and combining the domain of the destination site, the timestamp, and the token to form the data field.

Example 12 includes the at least one non-transitory computer readable medium of example 11, wherein the key is a pre-shared key.

Example 13 includes a method for deconflicting user authorization to navigate to a website, the method comprising identifying a first request to be transmitted from a client device to a destination site identified by a uniform resource locator (URL), determining, by executing an instruction with a processor, whether the first request indicates that a user has authorized navigation to the destination site, in response to determining that the user has authorized the navigation to the destination site, generating, by executing an instruction with the processor a data field based on an address of a domain of the destination site, and transmitting a second request to a network security monitor, the second request to indicate to the network security monitor that the user has authorized the navigation to the destination site, the second request including the data field and the URL.

Example 14 includes the method of example 13, further including adding an identifier of the domain of the destination site to an exception list in response to determining that the user has authorized the navigation to the destination site.

Example 15 includes the method of example 13, further including determining whether the first request should be blocked in response to determining that the user has not authorized the navigation to the destination site.

Example 16 includes the method of example 15, further including causing a prompt to be displayed requesting the user to authorize the navigation to the destination site in response to determining that the first request should be blocked.

Example 17 includes the method of example 15, further including transmitting the first request to the destination site in response to determining that the first request should not be blocked.

Example 18 includes the method of example 13, wherein the generating of the data field includes calculating a timestamp of the first request, encoding the timestamp and the domain of the destination site, computing a token of the encoded timestamp, the encoded domain of the destination site, and a key, and combining the domain of the destination site, the timestamp, and the token to form the data field.

Example 19 includes the method of example 18, wherein the key is a pre-shared key.

Example 20 includes an apparatus for deconflicting user authorization to navigate to a website, the apparatus comprising means for identifying a first request to be transmitted from a client device to a destination site identified by a uniform resource locator (URL), means for determining whether the first request indicates that a user has authorized navigation to the destination site, and means for generating, in response to determining that the user has authorized the navigation to the destination site, a data field based on the domain of the destination site, wherein the means for identifying is to transmit a second request to a network security monitor, the second request to indicate to the network security monitor that the user has authorized the navigation to the destination site, the second request including the data field and the URL.

Example 21 includes the apparatus of example 20, wherein the means for determining is to, in response to determining that the user has authorized the navigation to the destination site, add the domain of the destination site to an exception list.

Example 22 includes the apparatus of example 20, wherein the means for determining is to, in response to determining that the user has not authorized the navigation to the destination site, determining whether the first request should be blocked.

Example 23 includes the apparatus of example 22, wherein the means for determining is to, in response to determining that the first request should be blocked, cause a prompt to be displayed requesting the user to authorize the navigation to the destination site.

Example 24 includes the apparatus of example 22, wherein the means for identifying is to, in response to determining that the first request should not be blocked, transmit the first request to the destination site.

Example 25 includes an apparatus to protect network nodes, the apparatus comprising a site authenticator to determine whether a request accessed at a network node indicates that a user has authorized the request to be transmitted to a destination site, a uniform resource locator (URL) analyzer to extract a first token included in the request, a URL encoder to calculate a second token based on a domain of the destination site and a key, a hash validator to verify that the first token matches the second token, and a site redirector to, in response to the first token matching the second token, direct the request to the destination site.

Example 26 includes the apparatus of example 25, wherein the site authenticator is to, in response to the determination that the user has not authorized the request to be transmitted to the destination site, determine whether the request should be blocked, and the site redirector is to, in response to determining that the request should be blocked, redirect the request to a webpage including a prompt to enable the user to indicate the authorization of the request to be transmitted to the destination site.

Example 27 includes the apparatus of example 25, wherein the site authenticator is to, in response to the first token matching the second token, add an identifier of the domain of the destination site to an exception list.

Example 28 includes the apparatus of example 27, further including, in response to the first token not matching the second token, a site redirector to redirect the request to a webpage including a prompt to enable the user to indicate the authorization of the request to be transmitted to the destination site.

Example 29 includes the apparatus of example 25, wherein the key is a shared key.

Example 30 includes the apparatus of example 25, wherein the second token is generated based on an encoded timestamp.

Example 31 includes at least one non-transitory machine readable medium comprising instructions that, when executed, cause at least one processor to at least determine whether a request accessed at a network node indicates that a user has authorized the request to be transmitted to a destination site, extract a first token included in the request, calculate a second token based on a domain of the destination site and a key, verify that the first token matches the second token, and in response to the first token matching the second token, direct the request to the destination site.

Example 32 includes the at least one non-transitory machine readable medium of example 31, further including, in response to the determination that the user has not authorized the request to be transmitted to the destination site determining whether the request should be blocked, and in response to determining that the request should be blocked, redirecting the request to a webpage including a prompt to enable the user to indicate the authorization of the request to be transmitted to the destination site.

Example 33 includes the at least one non-transitory machine readable medium of example 31, further including, in response to first token matching the second token, adding an identifier of the domain of the destination site to an exception list.

Example 34 includes the at least one non-transitory machine readable medium of example 33, further including, in response to the first token not matching the second token, a site redirector to redirect the request to a webpage including a prompt to enable the user to indicate the authorization of the request to be transmitted to the destination site.

Example 35 includes the at least one non-transitory machine readable medium of example 31, wherein the key is a shared key.

Example 36 includes the at least one non-transitory machine readable medium of example 31, wherein the second token is further generated based on an encoded timestamp.

Example 37 includes a method for protecting a network nodes, the method comprising determining, by executing an instruction with a processor, whether a request accessed at a network node indicates that a user has authorized the request to be transmitted to a destination site, extracting a first token included in the request, calculating, by executing an instruction with the processor, a second token based on a domain of the destination site and a key, verifying, by executing an instruction with the processor, that the first token matches the second token, and in response to the first token matching the second token, directing the request to the destination site.

Example 38 includes the method of example 37, further including, in response to the determination that the user has not authorized the request to be transmitted to the destination site determining whether the request should be blocked, and in response to determining that the request should be blocked, redirecting the request to a webpage including a prompt to enable the user to indicate the authorization of the request to be transmitted to the destination site.

Example 39 includes the method of example 37, further including, in response to first token matching the second token, adding an identifier the domain of the destination site to an exception list.

Example 40 includes the method of example 39, further including, in response to the first token not matching the second token, a site redirector to redirect the request to a webpage including a prompt to enable the user to indicate the authorization of the request to be transmitted to the destination site.

Example 41 includes the method of example 37, wherein the key is a pre-shared key.

Example 42 includes the method of example 37, wherein the second token is further generated based on an encoded timestamp.

Example 43 includes an apparatus for protecting network nodes, the apparatus comprising means for determining whether a request accessed at a network node indicates that a user has authorized the request to be transmitted to a destination site, means for extracting to extract a first token included in the request, means for calculating a second token based on a domain of the destination site and a key, means for validating to verify that the first token matches the second token, and means for directing to, in response to the first token matching the second token, direct the request to the destination site.

Example 44 includes an apparatus for generating a token from data gathered from a URL, the apparatus comprising at least one processor, and memory including instructions that, when executed, cause the at least one processor to at least identify data to be encoded into a token, compute a hashed string based on the data to be encoded, determine a number of characters to be included in the token, select a subset of characters from the hashed string, and generate the token using the subset of characters from the hashed string.

Example 45 includes the apparatus of example 44, wherein the at least one processor is to select the subset of characters by initializing an index counter to a number of characters expected in the token, initializing a token value, calculating a modulus of the hashed string by the value of the index counter, selecting a character at an index of a modulus operation in the hashed string, adding the selected character to the token value, removing the selected character from the hashed string, decrementing the index counter, and returning the token value once a length of the token meets the number of characters to be included in the token.

Example 46 includes the apparatus of example 44, wherein the at least one processor is to identify the data to be encoded by identifying a requested URL domain, a timestamp, and a key.

Example 47 includes the apparatus of example 46, wherein at least one processor is to compute the hashed string by concatenating string representations of the data to be encoded together, calculating a SHA256 hash of a concatenated string, and converting the SHA256 hash into a base32 string.

Example 48 includes the apparatus of example 47, wherein the base32 string utilizes lowercase alphanumeric characters and numeric characters from zero to five.

Example 49 includes the apparatus of example 46, wherein the key is a pre-shared key.

Example 50 includes the apparatus of example 44, wherein the identifying of data to be encoded includes identifying metadata regarding an origin of a destination site request.

Example 51 includes the apparatus of example 44, wherein the determining of a number of characters to be included in the token includes determining a maximum number of characters supported in a domain label.

Example 52 includes at least one non-transitory computer readable storage medium comprising instructions that, when executed, cause at least one processor to at least identify data to be encoded into a token, compute a hashed string based on the data to be encoded, determine a number of characters to be included in the token, select a subset of characters from the hashed string, and generate the token using the subset of characters from the hashed string.

Example 53 includes the at least one non-transitory computer readable storage medium of example 52, wherein the instructions, when executed, cause the at least one processor to select the subset of characters by initializing an index counter to a number of characters expected in the token, initializing a token value, calculating a modulus of the hashed string by the value of the index counter, selecting a character at an index of a modulus operation in the hashed string, adding the selected character to the token value, removing the selected character from the hashed string, decrementing the index counter, and returning the token value once a length of the token meets the number of characters to be included in the token.

Example 54 includes the at least one non-transitory computer readable storage medium of example 52, wherein the identifying of data to be encoded includes identifying a requested URL domain, a timestamp, and a key.

Example 55 includes the at least one non-transitory computer readable storage medium of example 54, wherein the computing of the hashed string includes concatenating string representations of the data to be encoded together, calculating a SHA256 hash of a concatenated string, and converting the SHA256 hash into a base32 string.

Example 56 includes the at least one non-transitory computer readable storage medium of example 55, wherein the base32 string utilizes lowercase alphanumeric characters and numeric characters from zero to five.

Example 57 includes the at least one non-transitory computer readable storage medium of example 54, wherein the key is a pre-shared key.

Example 58 includes the at least one non-transitory computer readable storage medium of example 52, wherein the identifying of data to be encoded includes identifying metadata regarding an origin of a destination site request.

Example 59 includes the at least one non-transitory computer readable storage medium of example 52, wherein the determining a number of characters to be included in the token includes determining a maximum number of characters supported in a domain label.

Example 60 includes a method for generating a token from data gathered from a requested destination URL, the method comprising identifying, by executing an instruction with the processor, data to be encoded into the token, computing, by executing an instruction with the processor, a hashed string based on the data to be encoded, determining, by executing an instruction with the processor, a number of characters to be included in the token, selecting, by executing an instruction with the processor, a subset of characters from the hashed string, and generating, by executing an instruction with the processor, the token using the subset of characters from the hashed string.

Example 61 includes the method of example 60, wherein the selecting of the subset of characters includes initializing, by executing an instruction with the processor, an index counter to a number of characters expected in the token, initializing, by executing an instruction with the processor, a token value, calculating, by executing an instruction with the processor, a modulus of the hashed string by the value of the index counter, selecting, by executing an instruction with the processor, a character at an index of a modulus operation in the hashed string, adding, by executing an instruction with the processor, the selected character to the token value, removing, by executing an instruction with the processor, the selected character from the hashed string, decrementing, by executing an instruction with the processor, the index counter, and returning, by executing an instruction with the processor, the token value once a length of the token meets the number of characters to be included in the token.

Example 62 includes the method of example 60, wherein the identifying of data to be encoded includes identifying a requested URL domain, a timestamp, and a key.

Example 63 includes the method of example 62, wherein the computing of the hashed string includes concatenating string representations of the data to be encoded together, calculating a SHA256 hash of a concatenated string, and converting the SHA256 hash into a base32 string.

Example 64 includes the method of example 63, wherein the base32 string utilizes lowercase alphanumeric characters and numeric characters from zero to five.

Example 65 includes the method of example 62, wherein the key is a pre-shared key.

Example 66 includes the method of example 60, wherein the identifying of data to be encoded includes identifying metadata regarding an origin of a destination site request.

Example 67 includes the method of example 60, wherein the determining a number of characters to be included in the token includes determining a maximum number of characters supported in a domain label.

Example 68 includes at least one non-transitory computer readable storage medium comprising instructions that, when executed, cause at least one processor to at least provide a first set of instructions to a a client device, provide a second set of instructions to a network node, in response to a user requesting access to a destination website identify a first request to be transmitted from the client device to a destination site identified by a uniform resource locator (URL), determine whether the first request indicates that a user has authorized navigation to the destination site, in response to determining that the user has authorized the navigation to the destination site, generate a data field based on an address of the domain of the destination site, an transmit a second request to a network security monitor, the second request to indicate to the network security monitor that the user has authorized the navigation to the destination site, the second request including the data field and the URL, and in response to a request to the destination site, at the network node determine whether a request accessed at the network node indicates that the user has authorized the request to be transmitted to the destination site, extract a first token included in the request, calculate a second token based on a domain of the destination site and a key, verify that the first token matches the second token, and in response to the first token matching the second token, direct the request to the destination site.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate example.

What is claimed is:

1. An apparatus for generating a token from data gathered from a URL, the apparatus comprising:
   at least one processor; and
   memory including instructions that, when executed, cause the at least one processor to at least:
   identify the data to be encoded into the token;
   compute a hashed string based on the data to be encoded;
   determine a number of characters to be included in the token;
   initialize an index counter to the number of characters to be included in the token;
   initialize a token value;
   calculate a modulus of (a) the hashed string divided by (b) a value of the index counter;
   select a character in the hashed string at an index of the modulus;
   add the selected character to the token value;
   remove the selected character from the hashed string;
   decrement the index counter;
   return the token value once a length of the token meets the number of characters to be included in the token; and
   generate the token using the token value.

2. The apparatus of claim 1, wherein the at least one processor is to identify the data to be encoded by identifying a requested URL domain, a timestamp, and a key.

3. The apparatus of claim 2, wherein the at least one processor is to compute the hashed string by:
   concatenating string representations of the data to be encoded together;
   calculating a SHA256 hash of a concatenated string; and
   converting the SHA256 hash into a base32 string.

4. The apparatus of claim 3, wherein the base32 string utilizes lowercase alphanumeric characters and numeric characters from zero to five.

5. The apparatus of claim 2, wherein the key is a pre-shared key.

6. The apparatus of claim 1, wherein the at least one processor is to identify the data to be encoded by identifying metadata regarding an origin of a destination site request.

7. The apparatus of claim 1, wherein the at least one processor is to determine the number of characters to be included in the token by determining a maximum number of characters supported in a domain label.

8. At least one non-transitory computer readable storage medium comprising instructions that, when executed, cause at least one processor to at least:
   identify data to be encoded into a token;
   compute a hashed string based on the data to be encoded;
   determine a number of characters to be included in the token;
   initialize an index counter to the number of characters to be included in the token;
   initialize a token value;
   calculate a modulus of (a) the hashed string divided by (b) a value of the index counter;
   select a character in the hashed string at an index of the modulus;
   add the selected character to the token value;
   remove the selected character from the hashed string;
   decrement the index counter;
   return the token value once a length of the token meets the number of characters to be included in the token; and
   generate the token using the token value.

9. The at least one non-transitory computer readable storage medium of claim 8, wherein the instructions, when executed, cause the at least one processor to identify a requested URL domain, a timestamp, and a key to identify the data to be encoded.

10. The at least one non-transitory computer readable storage medium of claim 9, wherein to compute the hashed string, the instructions, when executed, cause the at least one processor to:
    concatenate string representations of the data to be encoded together;
    calculate a SHA256 hash of a concatenated string; and
    convert the SHA256 hash into a base32 string.

11. The at least one non-transitory computer readable storage medium of claim 10, wherein the base32 string utilizes lowercase alphanumeric characters and numeric characters from zero to five.

12. The at least one non-transitory computer readable storage medium of claim 9, wherein the key is a pre-shared key.

13. The at least one non-transitory computer readable storage medium of claim 8, wherein the instructions, when executed, cause the at least one processor to identify metadata regarding an origin of a destination site request to identify the data to be encoded.

14. The at least one non-transitory computer readable storage medium of claim 8, wherein the instructions, when executed, cause the at least one processor to determine a maximum number of characters supported in a domain label to determine the number of characters to be included in the token.

15. A method for generating a token from data gathered from a requested destination URL, the method comprising:
    identifying, by executing an instruction with a processor, the data to be encoded into the token;
    computing, by executing an instruction with the processor, a hashed string based on the data to be encoded;
    determining, by executing an instruction with the processor, a number of characters to be included in the token;
    initializing, by executing an instruction with the processor, an index counter to the number of characters to be included in the token;
    initializing, by executing an instruction with the processor, a token value;
    calculating, by executing an instruction with the processor, a modulus of (a) the hashed string divided by (b) a value of the index counter;
    selecting, by executing an instruction with the processor, a character in the hashed string at an index of the modulus;
    adding, by executing an instruction with the processor, the selected character to the token value;
    removing, by executing an instruction with the processor, the selected character from the hashed string;
    decrementing, by executing an instruction with the processor, the index counter;
    returning, by executing an instruction with the processor, the token value once a length of the token meets the number of characters to be included in the token; and
    generating, by executing an instruction with the processor, the token using the token value.

16. The method of claim 15, wherein identifying the data to be encoded includes identifying a requested URL domain, a timestamp, and a key.

17. The method of claim 16, wherein computing the hashed string includes:
concatenating string representations of the data to be encoded together;
calculating a SHA256 hash of a concatenated string; and
converting the SHA256 hash into a base32 string.

18. The method of claim 17, wherein the base32 string utilizes lowercase alphanumeric characters and numeric characters from zero to five.

19. The method of claim 16, wherein the key is a pre-shared key.

20. The method of claim 15, wherein identifying the data to be encoded includes identifying metadata regarding an origin of a destination site request.

21. The method of claim 15, wherein determining the number of characters to be included in the token includes determining a maximum number of characters supported in a domain label.

* * * * *